US010069960B2

(12) United States Patent
Alameh et al.

(10) Patent No.: US 10,069,960 B2
(45) Date of Patent: Sep. 4, 2018

(54) METHOD, ELECTRONIC DEVICE, AND ACCESSORY FOR CARRYING OUT FUNCTIONS BASED ON REFLECTED ELECTROMAGNETIC RADIATION

(71) Applicant: Google Technology Holdings, LLC, Mountain View, CA (US)

(72) Inventors: Rachid M. Alameh, Crystal Lake, IL (US); Michael David McLaughlin, San Jose, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 102 days.

(21) Appl. No.: 15/231,420

(22) Filed: Aug. 8, 2016

(65) Prior Publication Data

US 2017/0034337 A1    Feb. 2, 2017

Related U.S. Application Data

(63) Continuation of application No. 14/142,644, filed on Dec. 27, 2013, now abandoned.

(51) Int. Cl.
*H04M 1/00* (2006.01)
*H04M 1/725* (2006.01)
*H04M 1/02* (2006.01)
*H04M 1/18* (2006.01)

(52) U.S. Cl.
CPC ..... *H04M 1/72569* (2013.01); *H04M 1/0245* (2013.01); *H04M 1/72575* (2013.01); *H04M 1/185* (2013.01)

(58) Field of Classification Search
CPC .................................................. H04B 5/0043
USPC ..................... 455/41.1, 41.2, 41.3
See application file for complete search history.

(56) References Cited

U.S. PATENT DOCUMENTS

| | | | |
|---|---|---|---|
| 5,918,188 A | 6/1999 | Doran | |
| 7,338,193 B1 * | 3/2008 | Zeiger | G02B 6/0001 362/551 |
| 7,486,386 B1 | 2/2009 | Holcombe et al. | |
| 7,865,220 B2 * | 1/2011 | Feil | G03B 17/17 348/14.01 |
| 8,436,715 B2 | 5/2013 | Elgort et al. | |
| 2002/0030816 A1 | 3/2002 | Nakano et al. | |
| 2004/0043799 A1 | 3/2004 | Ishibashi et al. | |
| 2006/0060762 A1 | 3/2006 | Chan et al. | |
| 2006/0135226 A1 * | 6/2006 | Won | G06F 1/1616 455/575.3 |
| 2007/0032275 A1 * | 2/2007 | Suzuki | H05K 5/0247 455/575.3 |

(Continued)

FOREIGN PATENT DOCUMENTS

WO    WO 2013/063249    5/2013

*Primary Examiner* — Wen Huang
(74) *Attorney, Agent, or Firm* — Morgan, Lewis & Bockius LLP

(57) ABSTRACT

A method, electronic device, and accessory for carrying out functions based on reflected electromagnetic radiation are provided. According to one implementation, an electronic device transmits electromagnetic radiation ("EMR") to an accessory and detects a reflection of the transmitted EMR off of the accessory. A characteristic of the reflected EMR maps to a predetermined function associated with the accessory, which the electronic device performs.

20 Claims, 9 Drawing Sheets

(56) References Cited

U.S. PATENT DOCUMENTS

| | | | |
|---|---|---|---|
| 2007/0150764 A1* | 6/2007 | Chen | G06F 1/1616 |
| | | | 713/300 |
| 2007/0163814 A1 | 7/2007 | Won | |
| 2009/0325631 A1 | 12/2009 | Linjama et al. | |
| 2010/0290616 A1 | 11/2010 | Chou | |
| 2010/0295781 A1 | 11/2010 | Alameh et al. | |
| 2011/0304833 A1 | 12/2011 | Osaka et al. | |
| 2012/0211656 A1 | 8/2012 | Katz et al. | |
| 2012/0289162 A1 | 11/2012 | Hosoi et al. | |
| 2013/0033694 A1 | 2/2013 | Puig | |
| 2013/0049641 A1 | 2/2013 | Sheynblat et al. | |
| 2013/0100160 A1* | 4/2013 | Chang | G06F 1/3206 |
| | | | 345/619 |
| 2013/0297926 A1 | 11/2013 | Eaton et al. | |
| 2014/0028865 A1 | 1/2014 | Ohtaka et al. | |

* cited by examiner

METHOD, ELECTRONIC DEVICE, AND ACCESSORY FOR CARRYING OUT FUNCTIONS BASED ON REFLECTED ELECTROMAGNETIC RADIATION

CROSS-REFERENCE TO RELATED APPLICATION

This is a continuation of U.S. patent application Ser. No. 14/142,644, filed Dec. 27, 2013, entitled "METHOD, ELECTRONIC DEVICE, AND ACCESSORY FOR CARRYING OUT FUNCTIONS BASED ON REFLECTED ELECTROMAGNETIC RADIATION," which is incorporated herein for all purposes.

TECHNICAL FIELD

The present disclosure is related generally to wireless device communication and, more particularly, to an electronic device carrying out functions based on reflected electromagnetic radiation from an accessory.

BACKGROUND

With the introduction of short-range communication technologies, such Bluetooth®, electronic devices, such as smart phones, can be wirelessly connected with many types of accessories. When such connection occurs, the accessory typically communicates its capabilities and properties to the electronic device so that the electronic device can interact appropriately with the accessory. There are many types of accessories, however, that have no wireless capability and, in many cases, no power. Such non-wireless accessories include cases, skins, holsters, and folios. Yet there are many possible functions that could be performed with respect to such accessories if there were some mechanism for the electronic devices to obtain information about them.

DRAWINGS

While the appended claims set forth the features of the present techniques with particularity, these techniques, together with their objects and advantages, may be best understood from the following detailed description taken in conjunction with the accompanying drawings of which:

Figure 5A:
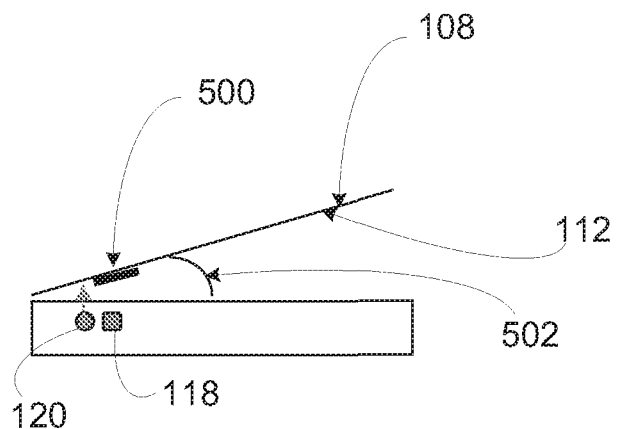
Figure 5B:
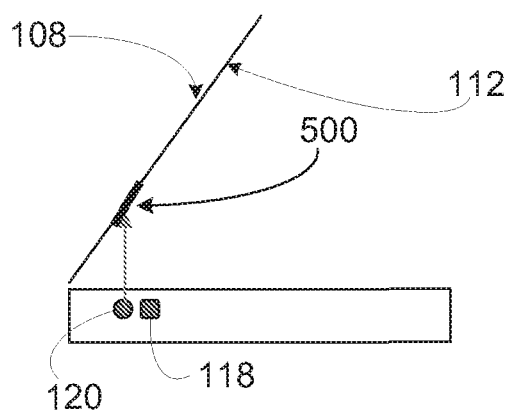
Figure 5C:
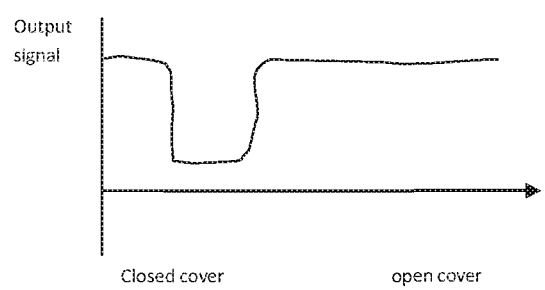
Figure 6A:
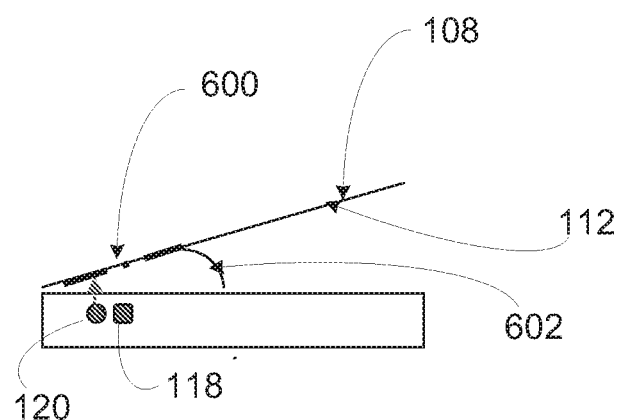
Figure 6B:
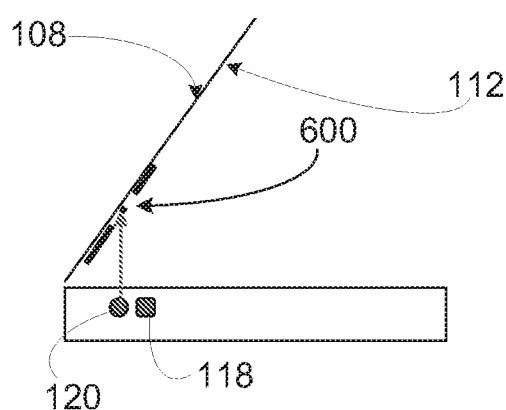
Figure 6C:
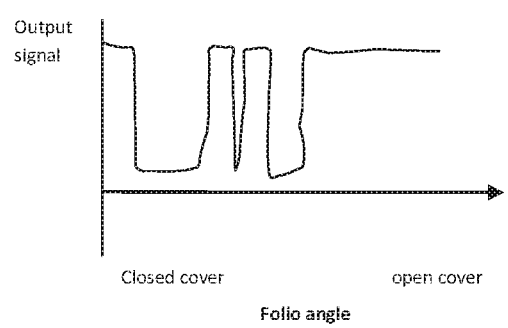
Figure 7:
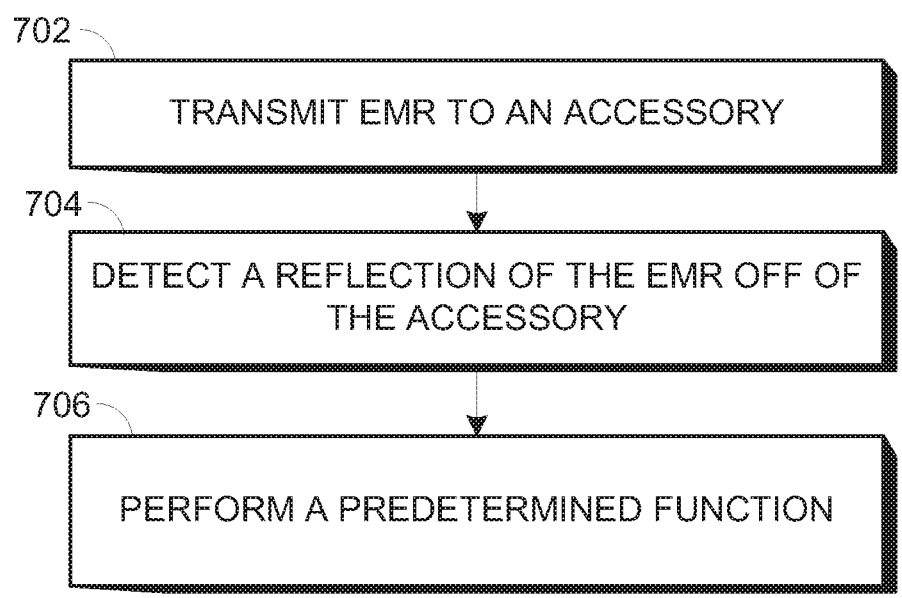

FIGS. 5A, 5B, and 5C show how an electronic device obtains a reflection profile from a folio cover by using a pattern on a folio cover according to an embodiment;

FIGS. 6A, 6B, and 6C show how an electronic device obtains a reflection profile from a folio cover by using a pattern on the folio cover according to another embodiment; and FIG. 7 shows steps taken by the electronic device to carry out functions based on reflected electromagnetic radiation according to an embodiment.

DESCRIPTION

This disclosure is generally directed to a method and electronic device for carrying out functions based on electromagnetic radiation ("EMR") reflected from an accessory. According to various embodiments, the accessory has physical characteristics or physical features that reflect EMR with an identifiable profile. Examples of such physical characteristics include the color, shape, finish, texture, unique stickers, or material of the accessory. Examples of physical features include a pattern, sticker, barcode, or hole on the accessory. Different reflection profiles are stored in the electronic device and each profile is mapped to a particular function of the electronic device.

In one embodiment, the method can be used to distinguish between different folios. For example, each folio can have a unique reflective surface (unique color, texture, size, pattern, etc.). As the folio is closed over the device (e.g., over the display that the folio protects) and over a proximity detector (EMR sensor) of the electronic device, the range between the folio cover and the EMR sensor is reduced (e.g., from about 1 foot, when the folio is not attached to the device to zero inches, when the folio is closed). The electronic device sweeps the power of one or more EMR transmitters (e.g., the power of infrared light-emitting diodes (LEDs)), the sensitivity of the EMR sensor, or both until the output of the EMR sensor is out of saturation (e.g., from 1 inch to 0 inches). The electronic device then captures a received reflection profile. Relying on colors may allow a limited number of folios to be identified. In one embodiment, the electronic device simply determines whether the color is bright, dark, or medium.

Figure 1A:
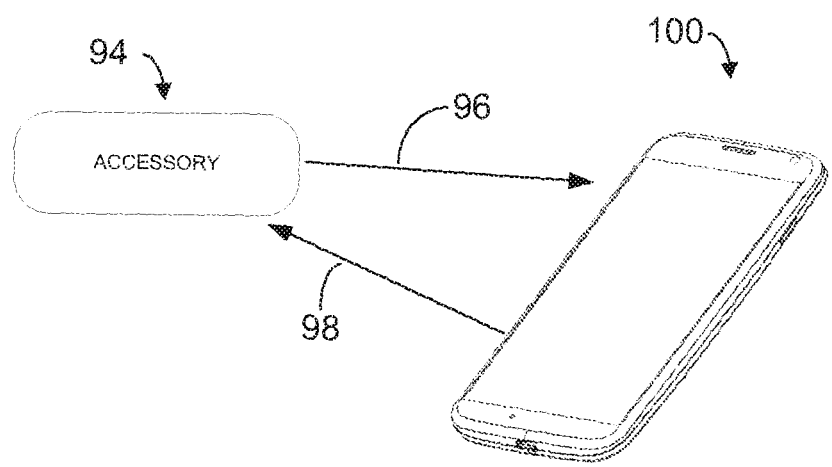
FIG. 1A is an overview of an interaction between an electronic device and an accessory according to an embodiment.

Turning to FIG. 1A, according to various embodiments, an electronic device 100 transmits EMR 96 (e.g., infrared light, radio waves, or visible light), which is reflected off of an accessory 94 of the electronic device 100. The electronic device 100 senses the reflected EMR 98 and, based on characteristics of the reflected EMR 98, carries out a predetermined function with respect to the accessory. Possible implementations of the electronic device 100 include a cell phone, smartphone, personal digital assistant, dedicated camera, and portable music player. Although depicted in FIG. 1 as a mobile electronic device, the electronic device 100 need not be mobile. Possible implementations of the accessory 94 include a folio, stylus, headset, a wearable product, and a dock for the electronic device (which could reflect a code for auto-pairing).

Figure 1B:
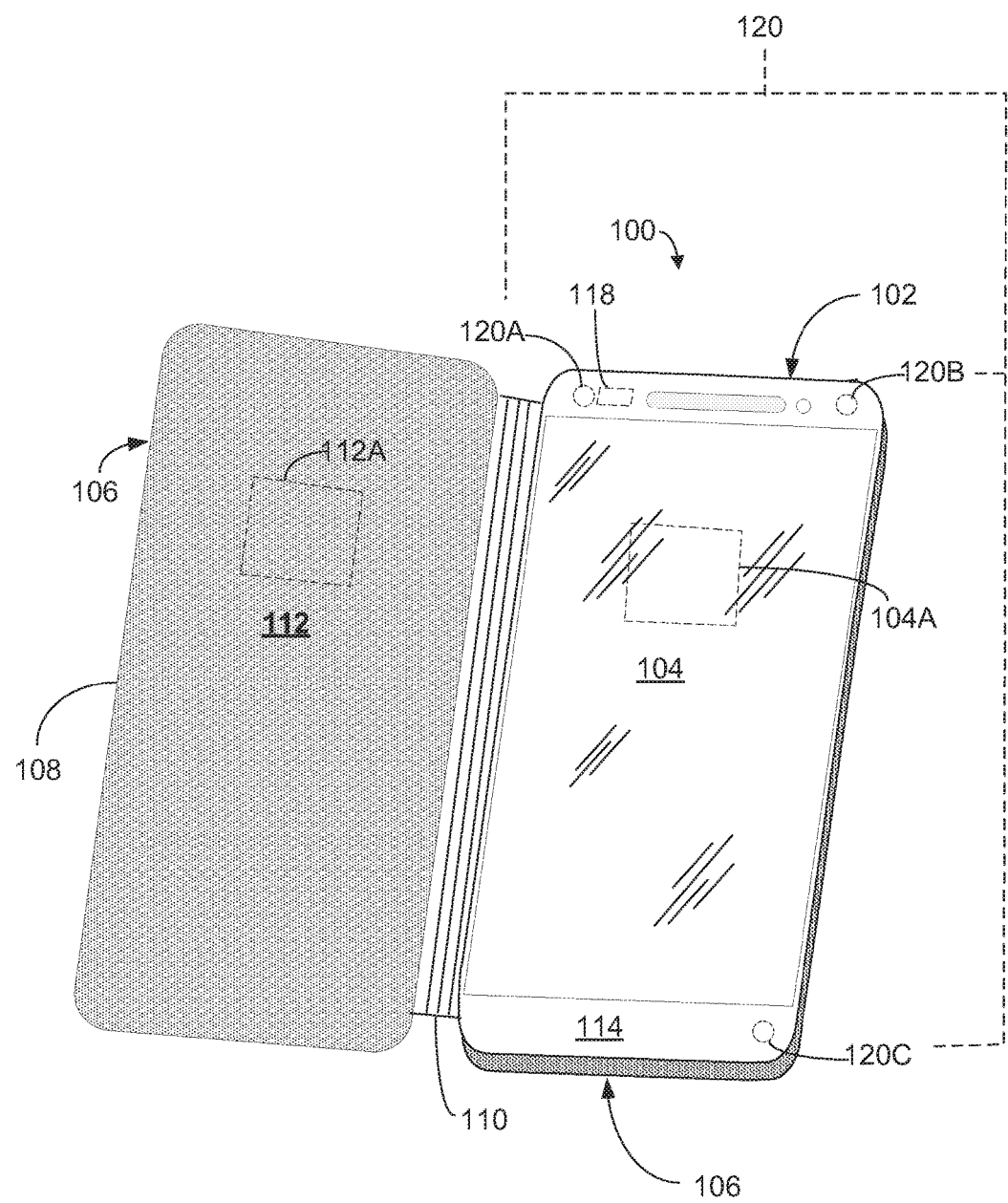
FIG. 1B and FIG. 1C depict an electronic device attached to a folio according to an embodiment.

Turning to FIG. 1B, the electronic device 100, according to an embodiment, has housing 102, and a display 104 integrated with the housing 102. The electronic device 100 is attached to a folio 106. The folio 106 has a cover 108 that is attached to the rest of the folio 106 by a hinge 110. The cover 108 has an interior surface 112. Integrated with the housing 102 and on or embedded within an upper surface 114 of the electronic device 100 are an EMR sensor 118, a first EMR source 120A, a second EMR source 120B, and a third EMR source 120C (referred to generically as EMR source or sources 120). Possible implementations of the EMR sources 120 include infrared light sources (such as infrared light emitting diodes), radio frequency sources, and visible light sources.

Figure 1C:
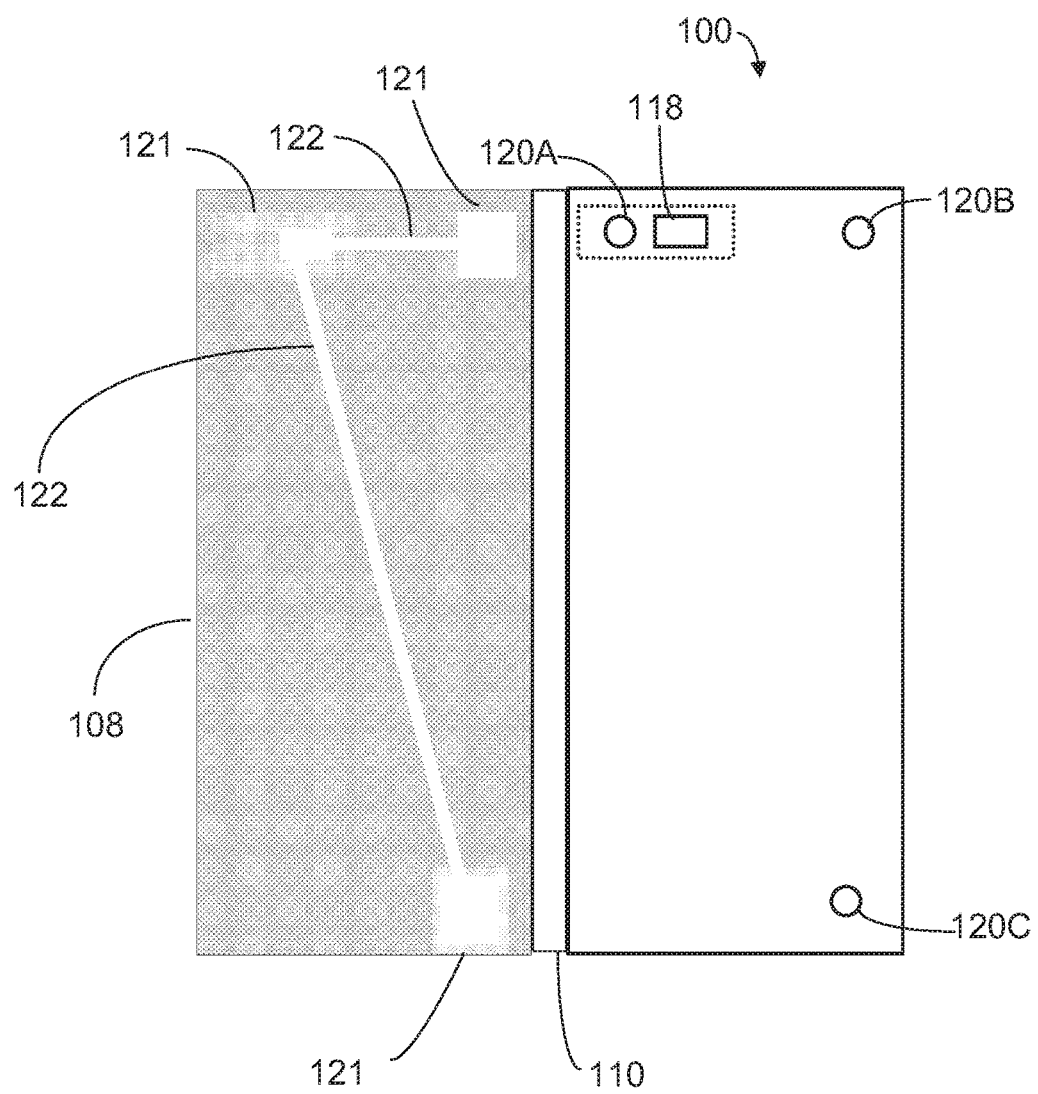

Turning to FIG. 1C, the cover 108 of the folio 106 has an embedded waveguide 122 which, in one embodiment, is a thin, plastic structure such as a fiber fishing line. When the cover 108 is closed over the electronic device 100, the waveguide 122 couples the second EMR source 120B and the third EMR source 120C to the EMR sensor 118 so that EMR originating from the second and third EMR sources 120B and 120C are directed to the EMR sensor 118. According to an embodiment, areas 121 are transparent to the EMR emitted by the EMR sources 120, thereby allowing interaction with the electronic device 100 using the EMR sources 120 and the EMR sensor 118 to take place when the cover 108 is closed. According to one embodiment, the EMR sensor 118 receives three serial reflections when cover 108 is closed (from the three EMR sources 120). As will be described in further detail below, these serial pulses result in potential nine potential folio combinations (000, 001, 010, 011, 100, 101, 110, Ill) for a given color.

Figure 2:
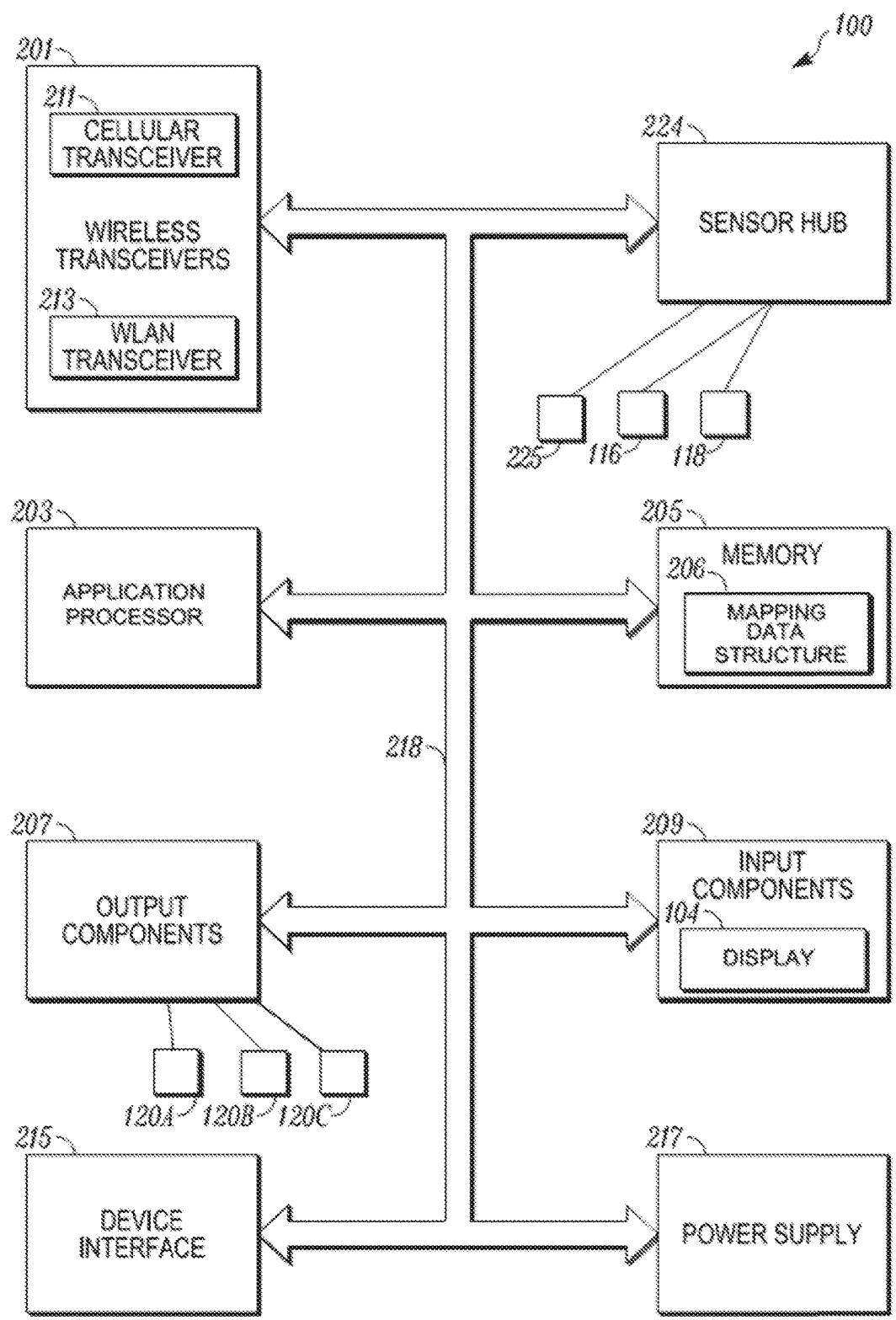
FIG. 2 is a simplified block diagram of a representative electronic device according to an embodiment.

Turning to FIG. 2, the electronic device 100 (FIG. 1) further includes one or more wireless transceivers 201, an application processor 203, a memory 205, one or more output components 207 (including the first, second, and third EMR sources 120A, 120B, and 120C), and one or more input components 209 (including, if implemented with a touch screen, the display 104). Stored within the memory 105 is a mapping data structure 206. An accelerometer 225 and the EMR sensor 118 are electrically coupled to the sensor hub 224. The sensor hub 224 may be implemented as a low-power processor (i.e., a processor that consumes less power than the application processor 203), which can carry out methods described herein. The term "processor" may refer to either the sensor hub 224 or to the application processor 203. Other components of the electronic device 100 include a electronic device interface 215 and a power supply 217. The components depicted in FIG. 2 are coupled directly or indirectly with one another by one or more communication links 218 (e.g., an internal communication bus). The wireless transceivers 201 include a cellular transceiver 211 and a wireless local area network ("WLAN") transceiver 213.

In an embodiment of the disclosure, the sensor hub 224, in addition to controlling the various sensors, also serves to control operation of the display 104 (and the functionality that supports it) when the electronic device 100 is in a sleep mode. In contrast, which the electronic device 100 is awake, the display 104 (and the functionality that supports it) is under the control of the application processor 203.

Possible implementations of the application processor 203 include a microprocessor, microcomputer, and application-specific integrated circuit. One or both the application processor 203 and the sensor hub 224 execute instructions retrieved from the memory 205 in order to carry out methods and functions of the electronic device as described herein.

It is to be understood that FIG. 2 is provided for illustrative purposes only, and is not intended to be a complete schematic diagram of the various components required for an electronic device.

Continuing with FIG. 2, the mapping data structure 206 maps different EMR characteristics (as detected by the EMR sensor 118) to different functions to be carried out by the electronic device 100. Examples of functions include changing the lighting of the display 104, painting a particular area of the display 104, changing the color images on the display 104, turning on the display 104, turning off the display 104, changing an alert type for the device 100, changing the volume of the device 100, changing the call handling of the device 100, launching an application, turning the electronic device 100 on, turning the electronic device 100 off, redirecting display updates (and user touch interactions) to/from a second (alternative) display, and putting the electronic device 100 into sleep mode.

Turning back to FIG. 1B, one or more of the EMR sources 120 project EMR, which is reflected off of the accessory 94 (FIG. 1A). The EMR sensor 118 detects the reflected EMR and generates a signal based on characteristics of the reflected EMR. Such characteristics may include one or more of wavelength, frequency, waveform, reflection profile, reflection pattern, and reflection amplitude, of the reflected EMR 98 (FIG. 1A). The sensor hub 224 receives the signal and provides the signal to the application processor 203 (FIG. 2). The application processor 203 references the mapping data structure 206 (FIG. 2) to select a function the electronic device 100 should perform.

Continuing with FIG. 1B, an example of a mapping between EMR characteristics and functions of electronic device 100 is as follows: a first set of EMR characteristics maps to turning the electronic device 100 off, a second set of EMR characteristics maps to putting the electronic device 100 into a low-power mode, and a third set of EMR characteristics maps to displaying a clock at location 104A. In addition to mapping EMR characteristics directly the functions, the mapping data structure 206 (FIG. 2) may also map the visible light characteristics to the type or model of the accessory or to capabilities of the electronic device.

In an embodiment, the electronic device 100 (FIG. 1B) transmits EMR having different characteristics in different time slots. This allows the device 100 to identify which EMR source transmitted the EMR that reflected off of the accessory and is ultimately detected by EMR sensor 118. In one example, the first EMR source 120A transmits in the first time slot, the second EMR source 120B transmits in the second time slot, and the third EMR source 120C transmits in the third time slot, with the process repeating.

According to an embodiment, one or more characteristics of the reflected EMR translate to a code, such as a binary code. An example scenario is as follows: reflected EMR that is predominately blue translates to a binary zero, while reflected EMR that is predominately red translates to a binary one.

According to an embodiment, the EMR sources 120 transmit EMR in a sequential manner so that their reflected EMR translates into a multi-bit binary code. In this embodiment, when the cover 108 is closed (FIG. IC) the EMR sensor 118 receives three serial reflections one from the first EMR source 120A (proximity reflection), one from the second EMR source 120B (via the waveguide 122 or by allowing it to exit the folio through a window in that specific folio type and reflect off of the user) and one from the third EMR source 120C (via the waveguide 122 or allowing it to exit as previously discussed). These serial pulses could constitute a code that may potentially map to nine different folios (000, 001, 010, 011, 100, 101, 110, Ill). Additionally, such a code can include not just colors and sequence-but could mix-in other reflection characteristics as well to create a more comprehensive code (from reflections).

In one example, the first EMR source 120A pulses EMR for a 9.6 microsecond pulse every 10 millisecond interval beginning at time 0, the second EMR source 120B pulses EMR for a 9.6 microsecond pulse every 10 millisecond interval beginning at time 120 microseconds (which is the gap between pulses) and the third EMR source 120C pulses EMR for a 9.6 microsecond pulse every 10 millisecond interval beginning at time 240 microseconds. In this way, the EMR sensor 118 detects the reflected EMR from each EMR source at a distinct moment in time and translates each instance into a binary zero and a binary one, resulting in a three bit number. Each three bit number might be associated with a different folio or even a different accessory altogether. The mapping data structure 206 (FIG. 2) could also map each three bit number to a different function that the electronic device 100 is to take, where each action is associated to the folio 106 or other type of accessory 94 (FIG. 1A) with which the electronic device 100 is associated.

Figure 3:
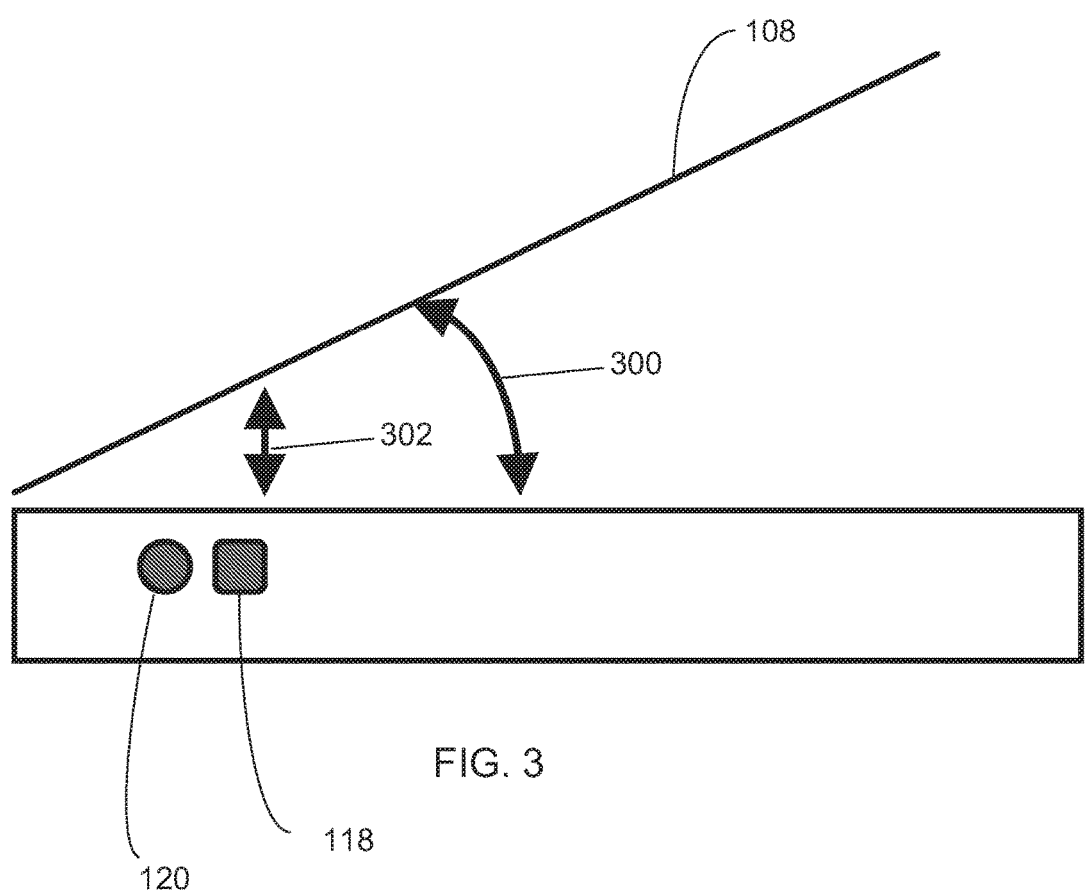
FIG. 3 shows the interaction between a folio cover and the electronic device according to an embodiment.

Turning FIG. 3, a description of the interaction between the electronic device 100 and the folio 106 in an embodiment of the disclosure will now be provided. Under normal use, the distance 302 between the folio cover 108 and the EMR sensor 118 as well as the angle 300 between them varies as a user opens or closes the folio cover 108. In one embodiment, the electronic device 100 determines a function to perform with respect to the folio cover 108 by varying the transmit power of one or more of the EMR sources 120 the receive power of the EMR sensor 118, or both, so as to take the EMR sensor 118 out of a saturated state. The electronic device 100 determines the reflection profile of the folio cover 108 which, in this embodiment, is the curve of output signal EMR sensor 118 versus the angle of the folio cover 108 with respect to the EMR sensor 118. The electronic device 100 then refers to the mapping data structure 206 (FIG. 2) to determine the function to which the reflection profile maps. The reflection profile represents the color of the folio cover 108, and the function to which the profile maps may relate one or both the color and reflectance of the folio cover 108. For example, if the reflection profile relates to the color red, the function to which the profile maps may be to display a clock shown on the display 104 at location 104A a red tint.

In one example, the processor mapping data structure 206 (FIG. 2) indicates that, based on the reflection profile, the electronic device 100 should, when the folio cover 108 is closed, display the time on the display 104 at position 104A—e.g., because the folio cover 108 has a translucent window at position 112A. In another example, if no window is available, the electronic device 100 should turn off the display 104 to conserve power.

Continuing with FIG. 3, according to an embodiment, for the electronic device 100 to be able to distinguish colors, the EMR sensor 118 needs to operate in the linear region (not saturated). For example, if the accessory is the folio 106, then after the electronic device 100 detects the cover 108 has been closed—i.e., the electronic device 100 sweeps the transmit power of the EMR sources 120 or the gain of the EMR sensor 118, or both—the electronic device monitors the rise in the output of the EMR sensor 118 from zero toward saturation. Alternatively, the electronic device 100 could start the sweep at saturation and end at zero. Based on the rise profile while in the linear region (i.e., the reflection profile), the electronic device 100 begins to determine what the color the cover 108 is or what type of folio the folio 106 is.

Put another way, the transmit power of the EMR sources 120, the gain of the EMR sensor 118, or both are swept following closure of the cover 108 from high to low or low to high (low corresponds to little or no detection by the EMR sensor 118, while high corresponds to high detection or saturation detection). The electronic device 100 captures the reflected EMR while sweeping the transmit power of the EMR sources 120 or receive gain of the EMR sensor 118, or both, over a range of transmit powers and sensitivities. This capture represents a reflection profile.

Each folio color or folio material maps to a reflection profile. For example, bright colors cause the EMR detector 118 to generate an output signal sooner and reach saturation levels much earlier than other colors when the cover 108 of the folio 106 is closed and vice versa. Each folio has a profile associated with it (slope, curve shape, etc.). These profiles are stored in the mapping data structure 206 (FIG. 2). Once the cover 108 is detected and closed, the electronic device 100 compares the detected profile with the stored profiles in order to identify the folio and sets the functionality of the electronic device 100 accordingly.

Figure 4:
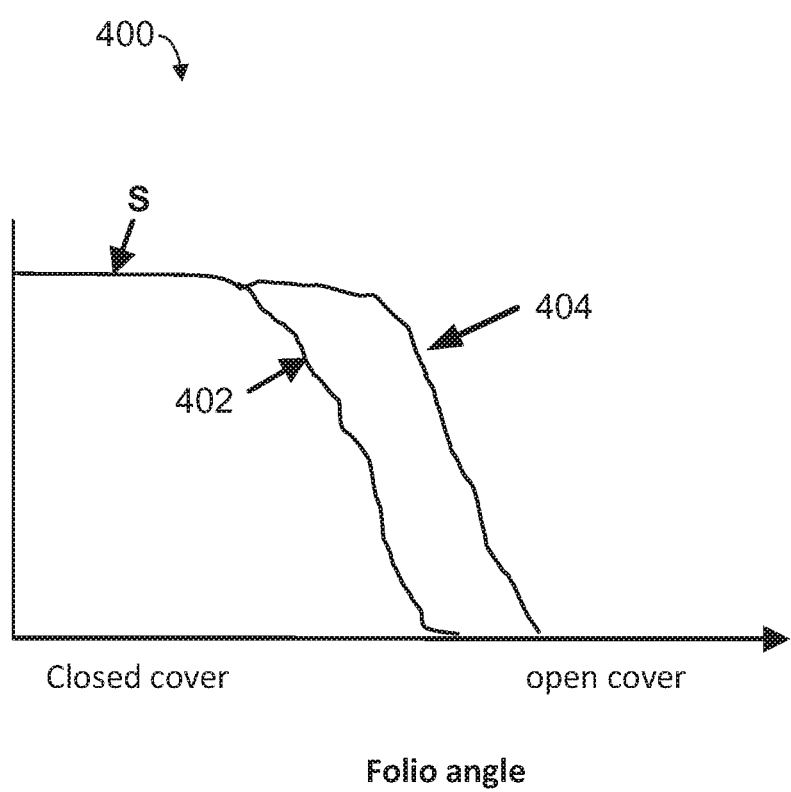
FIG. 4 shows two example reflection profiles.

FIG. 4 depicts reflection profiles 400 according to an embodiment. The reflection profiles 400 is plotted on a graph whose x-axis is the angle 300 (FIG. 3) between the folio cover 108 and the EMR sensor 118, and whose y-axis is the output signal of the EMR sensor 118. Region S represents the saturation region of the EMR sensor 118. The first reflection profile 402 shows a lower reflectance for the lower surface 112, thus indicating that the lower surface 112 has one or more of the following qualities: a lower reflectance color, a darker color (e.g., black), flatter material, or coarser material. In contrast, the second reflection profile 404 shows a higher reflectance for the lower surface 112 (requiring further separation between the device and folio to get out of saturation), thus indicating that the lower surface 112 has one or more of the following qualities: a higher reflectance color, a lighter color (e.g., silver), a higher reflectance (e.g., shiny) material, or a smooth.

According to another embodiment, depicted in FIGS. 5A, 5B, and 5C, the lower surface 112 of the folio cover 108 has a first pattern 500 that indicates a first function that the electronic device 100 is to perform. Accordingly, the mapping data structure 206 maps the different patterns to respective functions of the electronic device 100. The first pattern has white portions 504 and dark portions 506. As the folio cover 108 is closed—i.e., the angle 502 between the lower surface 112 of the folio cover 108 changes, the EMR transmitted from the EMR source 120 moves across different parts of the first pattern 500. As the EMR from the EMR source reflects off of a dark portion 506 of the pattern 500, the output signal (FIG. 5C) of the EMR sensor 118 (which is based on the reflected EMR) drops, whereas when the EMR from the EMR source 120 reflects off of a white portion 504, the output signal rises.

FIGS. 6A, 6B, and 6C depict the lower surface 112 of the folio cover 108 having a second, broken pattern 600 that indicates a second function that the electronic device 100 is to perform. The second pattern 600 has white portions 604 and dark portions 606. As with the example of FIGS. 5A, 5B, and 5C, when the folio cover 108 is closed, the angle 602 between the lower surface 112 of the folio cover 108 changes, and the EMR transmitted from the EMR source 120 moves across different parts of the second pattern 600. As the EMR from the EMR source reflects off of a dark portion 606 of the pattern 600, the output signal (FIG. 6C) of the EMR sensor 118 drops, whereas when the EMR from the EMR source 120 reflects off of a white portion 604, the output signal rises.

Turning to FIG. 7, a method 700 according to an embodiment of the disclosure proceeds as follows. At block 702, the electronic device (FIG. 1A) transmits EMR to an accessory 94 (arrow 96). At block 704, the electronic device 100 detects a reflection of the EMR off of the accessory 94 (arrow 98). A characteristic of the reflected EMR maps to a predetermined function of the electronic device 100, and the predetermined function is associated with the accessory 94. At block 706, the electronic device 100 performs the predetermined function.

It can be seen from the foregoing that a method, electronic device, and accessory for carrying out functions based on reflected electromagnetic radiation have been described. It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims.

We claim:

1. A method carried out by a mobile electronic device, the method comprising:
transmitting electromagnetic radiation (EMR) from a plurality of EMR sources of the mobile electronic device to a detachable cover accessory of the mobile electronic device, wherein:
the detachable cover accessory is configured to detachably couple to the mobile electronic device to cover and protect a display of the mobile electronic device;
the detachable cover accessory comprises a hinge configured to allow the detachable cover accessory to open and to close over the display; and
the detachable cover accessory includes a waveguide configured to couple light from at least a subset of the plurality of EMR sources to an EMR sensor of the mobile electronic device when the cover is opening and closing over the display;
when the detachable cover accessory is opening or closing over the display of the mobile electronic device, detecting, using the EMR sensor, a reflection of the transmitted EMR from the detachable cover accessory, wherein a characteristic of the reflected EMR maps to a predetermined function of the mobile electronic device, and wherein the predetermined function is associated with the detachable cover accessory; and
performing the predetermined function, wherein performing the predetermined function comprises adjusting a lighting of the display while the detachable cover accessory is opening or closing over the display.

2. The method claim 1, wherein transmitting the EMR from the plurality of EMR sources of the mobile electronic device to the detachable cover accessory comprises transmitting the EMR from each of the plurality of EMR sources to the detachable cover accessory.

3. The method of claim 1, wherein the EMR comprises infrared light, visible light, radio frequency EMR, or any combination thereof.

4. The method of claim 1, wherein:
transmitting the EMR comprises:
transmitting EMR having a first characteristic during a first time slot; and
transmitting EMR having a second characteristic during a second time slot;
detecting, using the EMR sensor, the reflection of the transmitted EMR comprises:
detecting a first reflection of the transmitted EMR of the first time slot from the detachable cover accessory;
detecting a second reflection of the transmitted EMR of the second time slot from the detachable cover accessory; and
performing the predetermined function comprises:
performing the predetermined function based on a code represented by the detected first reflection of the first time slot and the second reflection of the second time slot.

5. The method of claim 4, wherein:
transmitting the EMR having the first characteristic during the first time slot comprises utilizing a first EMR source to transmit the EMR having the first characteristic during the first time slot; and
transmitting the EMR having the second characteristic during the second time slot comprises utilizing a second EMR source to transmit the EMR having the second characteristic during the second time slot.

6. The method of claim 1, wherein transmitting the EMR comprises transmitting the EMR over a range of transmission powers and over a range of distances between the mobile electronic device and the detachable cover accessory, wherein the characteristic of the reflected light comprises a reflection profile that is based on the reflection of the EMR transmitted over the range of transmission powers and over the range of, and wherein the mobile electronic device is configured to select the predetermined function based on a comparison between the reflection profile and one or more stored reflection profiles.

7. The method of claim 6, further comprising:
adjusting one or both of a sensitivity of the EMR sensor over a range of sensitivities and the power of the transmitted EMR over the range of transmission powers, wherein the characteristic of the reflected light comprises a reflection profile that is based on the reflection of the EMR as detected over the range of sensitivities or over the range of transmission powers, and wherein the selection is based on a comparison between the reflection profile and a stored reflection profile of the one or more stored reflection profiles.

8. The method of claim 6, wherein the detachable cover accessory is attached to the mobile electronic device and a portion of the detachable cover accessory is pivotable with respect to the mobile electronic device over a range of angles, wherein transmitting the EMR comprises transmitting the EMR over one or both of the range of transmission powers and the range of angles.

9. The method of claim 8, comprising:
wherein the detachable cover accessory comprises a folio and the portion comprises a cover portion of the folio, the method further comprising:
varying a gain of the transmitted EMR, a gain of the EMR sensor, or both, to take the EMR sensor out of a saturated state when the cover closes on the mobile electronic device, wherein the characteristic of the EMR is a reflection profile of an angle between the cover portion of the folio and the EMR sensor versus an output signal of the EMR sensor, including when the EMR sensor is in the saturated state; and
selecting the function based on a comparison between the reflection profile and a stored reflection profile, wherein the stored profile is associated with a particular type of a detachable cover accessory.

10. The method of claim 1, wherein the characteristic of the reflected light comprises a wavelength, a frequency, a reflection profile, a reflection pattern, a reflection amplitude, or any combination thereof.

11. The method of claim 1, wherein performing the predetermined function comprises painting a particular area of the display, changing a color of images displayed on the display, activating the display, deactivating the display, changing an alert type for the mobile electronic device, adjusting a volume of the mobile electronic device, adjusting a call handling of the mobile electronic device, launching an application on the mobile electronic device, activating the mobile electronic device, deactivating the mobile electronic device, placing the mobile electronic device into a sleep mode, or any combination thereof.

12. The method of claim 1, wherein performing the predetermined function comprises displaying an image on a location of the display of the mobile electronic device, wherein the location corresponds to an area of the detachable cover accessory through which the image is displayed.

13. The method of claim 1, wherein performing the predetermined function comprises changing a color of images displayed on the display.

14. The method of claim 1, wherein performing the predetermined function comprises launching an application on the mobile electronic device or closing an application on the mobile electronic device.

15. An assembly, comprising:
   A mobile electronic device configured to transmit electromagnetic radiation (EMR) from a plurality of EMR sources of the mobile electronic device to a detachable cover accessory of the mobile electronic device; and
   the detachable cover accessory for the mobile electronic device, wherein:
      the detachable cover accessory is configured to detachably couple to the mobile electronic device to cover and protect a display of the mobile electronic device;
      the detachable cover accessory comprises a hinge configured to allow the detachable cover accessory to open and to close over the display;
      the detachable cover accessory includes a waveguide configured to couple light from at least a subset of the plurality of EMR sources to an EMR sensor of the mobile electronic device when the cover is opening and closing over the display; and
      the detachable cover accessory comprises a physical characteristic or physical feature configured to reflect the transmitted EMR, wherein the physical characteristic or physical feature is configured to convey information regarding a predetermined function of the mobile electronic device, and wherein the predetermined function is associated with the detachable cover accessory;
   wherein the mobile electronic device is further configured to:
      detect, using the EMR sensor, the reflected EMR; and
      perform the predetermined function based on the information, and wherein the mobile electronic device is configured to perform the predetermined function by adjusting a lighting of the display while the detachable cover accessory is opening or closing over the display.

16. The assembly of claim 15, wherein the physical characteristic comprises a color of the detachable cover accessory, a material composition of the detachable cover accessory, a finish of the detachable cover accessory, a reflective pattern on the detachable cover accessory, a size of the detachable cover accessory, a shape of a reflective surface of the detachable cover accessory, or any combination thereof.

17. The assembly of claim 15, wherein the hinge is configured to allow the detachable cover accessory to open and to close over the display of the mobile electronic device.

18. A detachable cover accessory for a mobile electronic device, the detachable cover accessory comprising:
   a folio comprising a cover;
   a hinge configured to allow the cover to open and to close over a display of the mobile electronic device to protect the display; and
   a waveguide configured to couple light from at least a subset of a plurality of electromagnetic radiation (EMR) sources of the mobile electronic device to an EMR sensor of the mobile electronic device when the cover is opening and closing over the display;
   wherein the folio is configured to detachably couple to the mobile electronic device, and wherein the folio further comprises a reflective portion configured to reflect the EMR, wherein the reflective portion comprises a physical characteristic configured to indicate a predetermined function to be performed by the mobile electronic device based on the reflected EMR, wherein the predetermined function comprises an adjustment of a lighting of the display while the detachable cover accessory is opening or closing over the display.

19. The detachable cover accessory of claim 18, wherein the physical characteristic comprises a color of the detachable cover accessory, a shape of the detachable cover accessory, a finish of the detachable cover accessory, a texture of the detachable cover accessory, a material of the detachable cover accessory, or any combination thereof.

20. The detachable cover accessory of claim 18, wherein the physical feature comprises a pattern, a sticker, a barcode, a hole on the detachable cover accessory, or any combination thereof.

* * * * *